US012638332B2

(12) United States Patent
Reinhardt et al.

(10) Patent No.: US 12,638,332 B2
(45) Date of Patent: May 26, 2026

(54) COLOR MEASUREMENT WITH STRUCTURED LIGHT

(71) Applicant: Ivoclar Vivadent AG, Schaan (LI)

(72) Inventors: Jonas Reinhardt, Igis (CH); Christian Niedrig, Azmoos (CH)

(73) Assignee: Ivoclar Vivadent AG, Schaan (LI)

( * ) Notice: Subject to any disclaimer, the term of this patent is extended or adjusted under 35 U.S.C. 154(b) by 325 days.

(21) Appl. No.: 18/358,105

(22) Filed: Jul. 25, 2023

(65) Prior Publication Data

US 2024/0035891 A1     Feb. 1, 2024

(30) Foreign Application Priority Data

Jul. 27, 2022    (EP) ..................................... 22187237

(51) Int. Cl.
    *G01J 3/50*          (2006.01)
    *G01J 3/02*          (2006.01)
    *G01J 3/12*          (2006.01)
    *G01J 3/42*          (2006.01)
(52) U.S. Cl.
    CPC ............... *G01J 3/508* (2013.01); *G01J 3/024* (2013.01); *G01J 3/0275* (2013.01); *G01J 3/12* (2013.01); *G01J 3/42* (2013.01); *G01J 2003/1282* (2013.01)
(58) Field of Classification Search
    CPC .......... G01J 3/508; G01J 3/024; G01J 3/0275; G01J 3/12; G01J 3/42; G01J 2003/1282; G01J 3/28; G01J 3/501; G01J 3/462; G01J 2003/467; A61B 5/0088; A61B 5/1032; A61B 5/4547; A61B 5/004; A61B 5/7235; A61C 9/006; A61C 19/04; G06T 7/0012; G06T 7/90; G06T 2207/30036
See application file for complete search history.

(56) References Cited

U.S. PATENT DOCUMENTS

| | | |
|---|---|---|
| 8,208,704 B2 | 6/2012 | Wong et al. |
| 8,571,281 B2 | 10/2013 | Wong et al. |
| 11,563,929 B2 | 1/2023 | Saphier et al. |
| 11,701,208 B2 | 7/2023 | Esbech et al. |
| 11,915,378 B2 | 2/2024 | Koza et al. |
| 12,251,278 B2 | 3/2025 | Glinec et al. |
| 2005/0116952 A1* | 6/2005 | Je ....................... G01B 11/2509 |
| | | 345/647 |
| 2007/0140553 A1 | 6/2007 | Katsumata |
| 2012/0231420 A1 | 9/2012 | Wong et al. |

(Continued)

*Primary Examiner* — Tarifur R Chowdhury
*Assistant Examiner* — Akbar H. Rizvi
(74) *Attorney, Agent, or Firm* — Ann M. Knab; Thad McMurray

(57) ABSTRACT

A method for spatially resolved color determination, comprising the steps of projecting (S101) a first structured-light pattern having a first wavelength of light onto a dental object; detecting (S102) a first spatially resolved optical parameter set based on the reflected or remitted first structured-light pattern; projecting (S103) a second structured-light pattern having a second wavelength of light onto the dental object; detecting (S104) a second spatially resolved optical parameter set based on the reflected or remitted second structured-light pattern; and calculating (S105) a third spatially resolved optical parameter set at a third wavelength of light based on the first and second spatially resolved optical parameter sets.

12 Claims, 3 Drawing Sheets

(56)  References Cited

U.S. PATENT DOCUMENTS

2016/0157723 A1 *  6/2016  Kanick ................ A61B 5/0075
                                                600/476
2017/0082486 A1 *  3/2017  Send ........................ G06T 7/73
2020/0132547 A1    4/2020  Yu
2020/0363194 A1 *  11/2020  Milch .................... G06T 7/521

* cited by examiner

Fig. 2

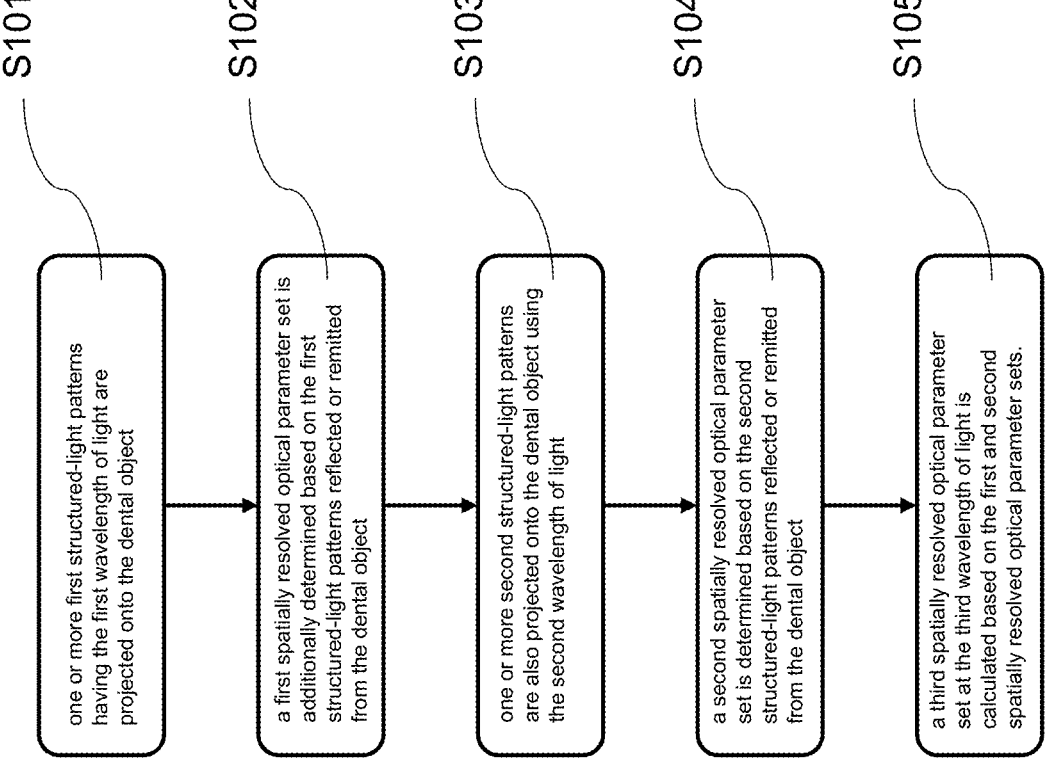

S101 one or more first structured-light patterns having the first wavelength of light are projected onto the dental object

S102 a first spatially resolved optical parameter set is additionally determined based on the first structured-light patterns reflected or remitted from the dental object

S103 one or more second structured-light patterns are also projected onto the dental object using the second wavelength of light

S104 a second spatially resolved optical parameter set is determined based on the second structured-light patterns reflected or remitted from the dental object

S105 a third spatially resolved optical parameter set at the third wavelength of light is calculated based on the first and second spatially resolved optical parameter sets.

COLOR MEASUREMENT WITH STRUCTURED LIGHT

CROSS-REFERENCE TO RELATED APPLICATIONS

This application claims priority to European Application No. 22187237.7 filed on Jul. 27, 2022, the disclosure of which is incorporated herein by reference in its entirety.

TECHNICAL FIELD

The present invention relates to a method for spatially resolved color determination and a color determination system for spatially resolved color determination.

BACKGROUND

If a color measurement is to be realized with an intraoral scanner on a tooth, there is on the one hand the problem that the installation space within the intraoral scanner is limited and only a small number of light sources can be arranged in a housing, for example, for the colors red, green and blue. Even if future light sources become more powerful and smaller, this will not change. The smaller the number of light sources, the smaller the required installation space within the intraoral scanner. On the other hand, however, the most accurate color determination requires as many light sources as possible, each with a different wavelength of light, in order to obtain a color measurement value at many wavelengths.

A spectroradiometer, for example, is a spectrometer that measures different wavelengths and amplitudes of emitted light. However, this measurement is not spatially resolved over a sample area, but only for the total light entering the device.

U.S. Pat. Nos. 11,701,208, 8,208,704, 8,571,281, 20070140553, 20120231420 and 20200132547 are directed to color mapping and/or spectral measurement/interpolation systems and methods and are hereby incorporated by reference in their entirety.

SUMMARY

It is the technical object of the present invention to perform spatially resolved and precise color determination with as few light sources as possible.

This technical object is solved by the subject matter according to the independent claims. Technically advantageous embodiments are the subject matter of the dependent claims, the description and the drawings.

According to a first aspect, the technical object is solved by a method for spatially resolved color determination, comprising the steps of projecting a first structured-light pattern having a first wavelength of light onto a dental object; detecting a first spatially resolved optical parameter set based on the reflected or remitted first structured-light pattern; projecting a second structured-light pattern having a second wavelength of light onto the dental object; detecting a second spatially resolved optical parameter set based on the reflected or remitted second structured-light pattern; and calculating a third spatially resolved optical parameter set at a third wavelength of light based on the first and second spatially resolved optical parameter sets. The method may also be performed based on additional structured-light patterns at additional wavelengths of light, further improving its accuracy in determining the third spatially resolved optical parameter set. The parameter set may comprise one or more parameters describing the optical properties of the dental object at different locations on the surface.

The method achieves the technical advantage that further spatially resolved optical parameter sets can be obtained at any wavelength of light. In this way, a complete color spectrum can be calculated for each location on the surface of the dental object. By calculating spatially resolved optical parameter sets, the number of light sources can be reduced, since measurement at this wavelength of light can be dispensed with. Nevertheless, spatially resolved color values can be determined with high accuracy.

In a technically advantageous embodiment of the method, the third spatially resolved optical parameter set is extrapolated from the first and the second spatially resolved optical parameter sets. This achieves the technical advantage, for example, that the third spatially resolved optical parameter set can be determined in a simple manner and with little computational effort. This is particularly advantageous if the third spatially resolved optical parameter set is to be calculated at small wavelength intervals outside the interval of the first and second wavelengths of light.

In another technically advantageous embodiment of the method, the third spatially resolved optical parameter set is interpolated between the first and the second spatially resolved optical parameter sets. This achieves the technical advantage, for example, that the third spatially resolved optical parameter set can be determined in a simple manner and with little computational effort. This is particularly advantageous if the interval between the first and second wavelengths of light is small.

In another technically advantageous embodiment of the method, the third parameter set is determined by a fit process based on the first and second spatially resolved optical parameter sets. By means of the fit process, a general functional relationship of an optical parameter depending on the wavelength of light, which is to be expected for the dental object, is adapted on the basis of the measured optical parameters at the first and the second wavelengths of light. This achieves the technical advantage, for example, that the color values can be determined with a high degree of accuracy.

In another technically advantageous embodiment of the method, a predetermined spectral course is adapted to the first and/or the second spatially resolved optical parameter set to obtain the third spatially resolved optical parameter set. For example, the third spatially resolved optical parameter set can be obtained by shifting the predetermined spectral course based on the first and/or the second spatially resolved optical parameter set. This achieves the technical advantage, for example, that the color values of the dental object can be determined and adjusted on the basis of an empirically measured course.

In a further technically advantageous embodiment of the method, the predetermined spectral course is a course of a reflectance, an absorption coefficient and/or a scattering coefficient depending on the wavelength of light. This achieves the technical advantage, for example, that particularly suitable optical parameters are used for color determination.

In another technically advantageous embodiment of the method, the first and/or second spatially resolved optical parameter set assigns one or more optical parameters to the locations of the surface of the dental object, respectively. The optical parameters at the locations of the surface also include those parameters for which the light penetrates a bit into the dental object. This achieves the technical advantage, for example, of knowing the optical parameters for each location of the surface at the first and second wavelengths of light.

In another technically advantageous embodiment of the method, the first structured-light pattern is generated with a first light source and the second structured-light pattern is generated with a second light source. The light sources can be formed by light emitting diodes or laser diodes. The narrower the bandwidth of the light source, the more precisely the optical parameters can be determined at the respective wavelength of light. This achieves the technical advantage, for example, that an exact spatially resolved determination of the optical parameters is achieved.

In another technically advantageous embodiment of the method, the method is carried out by an intraoral scanner. This achieves the technical advantage, for example, that spatially resolved color values of a tooth can be determined with high accuracy.

According to a second aspect, the technical object is solved by a color determination system for spatially resolved color determination, comprising a first projector or projection device for projecting a first structured-light pattern having a first wavelength of light onto a dental object; a first detector or detection device for detecting a first spatially resolved optical parameter set based on the reflected or remitted first structured-light pattern; a second projector or projection device for projecting a second structured-light pattern of a second wavelength of light onto the dental object; a second detector or detection device for detecting a second spatially resolved optical parameter set based on the reflected or remitted second structured-light pattern; and a calculator or calculation device for calculating a third spatially resolved optical parameter set at a third wavelength of light based on the first and second spatially resolved optical parameter sets. The first and second projection devices may be implemented within a single projection system. The first and second detection devices may be implemented within a single detection system. The color determination system achieves the same technical advantages as the method according to the first aspect.

In a technically advantageous embodiment of the color determination system, the color determination system is configured to extrapolate the third spatially resolved optical parameter set from the first and the second spatially resolved optical parameter sets and/or to interpolate the third spatially resolved optical parameter set between the first and the second spatially resolved optical parameter sets. This also achieves the technical advantage, for example, that the third parameter set can be determined in a simple and fast manner due to the linear relationship.

In another technically advantageous embodiment of the color determination system, the color determination system is configured to adapt a predetermined spectral course to the first and second spatially resolved optical parameter sets in order to obtain the third spatially resolved optical parameter set. This also achieves the technical advantage, for example, that the color values of the dental object can be determined and adapted on the basis of an empirically measured course.

In another technically advantageous embodiment of the color determination system, the color determination system comprises a first light source for generating the first structured-light pattern and a second light source for generating the second structured-light pattern. This also achieves the technical advantage, for example, that an accurate spatially resolved color determination is achieved.

According to a third aspect, the technical object is solved by an intraoral scanner with a color determination system according to the second aspect. This achieves the technical advantage that color values within an oral cavity, such as of teeth, can be determined accurately by spatially resolution.

BRIEF DESCRIPTION OF THE DRAWINGS

Exemplary embodiments of the invention are shown in the drawings and are described in more detail below, in which:

FIG. 2 shows a block diagram of a method for spatially resolved color determination.

DETAILED DESCRIPTION

Figure 1:
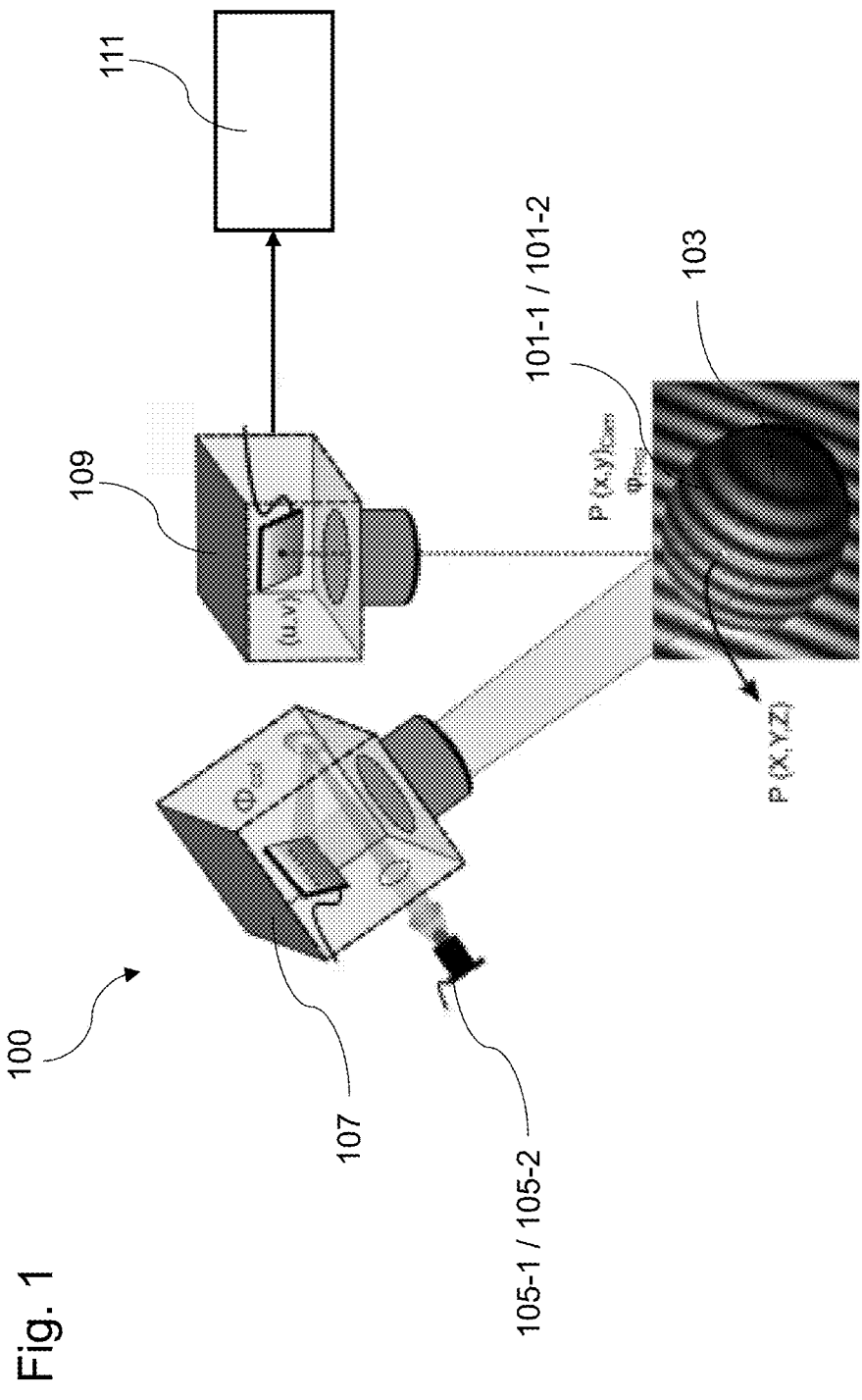
FIG. 1 shows a schematic view of a color determination system for spatially resolved color determination of a dental object.

FIG. 1 shows a schematic view of a color determination system 100 for spatially resolved color determination of a dental object 103. The color determination system 100 comprises a projector or projection device 107 as a structured-light projector, which can project structured-light patterns 101-1 and 101-2 with different spatial frequency and different wavelength of light onto the dental object 103. This projection device 107 comprises, for example, a micro LCD display, a digital mirror device (DMD) and suitable optics.

For example, the projector or projection device 107 projects structured-light patterns 101-1 with different spatial frequencies, i.e., distances of the stripes, at a first wavelength of light onto the dental object 103. Subsequently, the projection device 107 projects structured-light patterns 101-2 with different spatial frequencies at a second wavelength of light onto the dental object 103. The first and second wavelengths of light are different in this case.

For example, to project the structured-light patterns 101-1 and 101-2, the color determination system 100 may comprise two light sources 105-1 and 105-2 having respective wavelengths of light.

For example, the light sources 105-1 and 105-2 may be formed by light emitting diodes or laser diodes suitable for emitting light having the desired wavelength of light. Generally, further structured-light patterns with further wavelengths of light can also be used.

From these structured-light patterns 101-1 and 101-2, the spatial shape of the dental object 103 can be determined, for one thing. For this purpose, the structured-light patterns 101-1 and 101-2 reflected or remitted from the dental object 103 are detected by a detector or detection device 109, which may be formed by an electronic camera having a CCD chip. The detected images of the reflected or remitted structured-light patterns 101-1 and 101-2 are evaluated by a suitable algorithm, which can calculate the spatial shape of the dental object 103 from the course of the reflected or remitted structured-light pattern. For this purpose, triangulation is performed with an angle between incidence and remission.

This algorithm is executed on a digital processor 111. The data obtained about the spatial shape of the dental object 103 can be stored in a digital memory.

On the other hand, optical parameters can also be determined at each location of the surface of the dental object 103 at that wavelength of light which is used for the light of the respective structured-light pattern 101-1 and 101-2. From this, spatially resolved optical parameter sets can be obtained that indicate the optical properties for each location of the surface of the dental object 103 at that wavelength of light.

By a quantitative and spatially resolved measurement of the remitted and reflected intensity amplitude and phase shift, model-based quantities relevant for light propagation can be determined by solving the radiative transfer theory, such as the reflectance, the effective scattering coefficient and the absorption coefficient.

In general, the idea of color measurement with structured light is based on the fact that the optical properties of a material can be calculated by spatial resolution, i.e. over the surface of the illuminated material. In this case, a striped pattern is projected onto the material and the remitted light is measured with a camera. Subsequently, the optical parameters of the material can be calculated with model calculations based, for example, on solving the radiative transfer equation.

For example, the optical parameter is higher at one location of the dental object 103 than at another location of the dental object 103. This optical parameter can be determined in a spatially resolved manner, for example, from the intensity of the reflected or remitted stripes of the structured-light patterns 101-1 and 101-2. The optical parameter set then comprises, for example, a spatially resolved reflectance, an absorption and/or scattering coefficient.

If a first spatially resolved optical parameter set at the first wavelength of light and a second spatially resolved optical parameter set at the second wavelength of light are known, a third spatially resolved parameter set for a third wavelength of light can be calculated from these. In this case, a measurement by means of a further light source 105 can be dispensed with.

This reduces the number of light sources 105 within the color determination system 100.

Furthermore, in order to limit the number of light sources 105, if the material to be measured is known, i.e., for example, a natural tooth, the wavelengths of light used can be cleverly selected. For example, two structured-light patterns 101-1 and 101-2 having wavelengths of light of 450 nm and 600 nm can first be used to determine a first slope between the respective points of the spatially resolved parameter sets at 450 nm and 600 nm. Then, using two more structured-light patterns with light wavelengths at 520 nm and 650 nm, the characteristic minima in the reflectance curve can be measured. In this case, four light sources 105 are used to project the respective structured-light patterns 101.

A precise selection of light sources 105 with suitable wavelengths of light can be made in various ways. For example, an examination of the optical properties of numerous restoration materials or dental materials can be performed to find characteristic wavelengths of light at which differences in the wavelength spectrum can be expected. The structured-light patterns 101-1 and 101-2 are then projected with light of that found wavelength of light. The characteristic wavelengths of light can be stored in a database for each restoration material or dental material examined. The selection of light sources 105 to be used can then be performed based on the database and reasonable support point wavelengths.

In addition, optical data that have been measured as reflection spectra in vivo in as many people as possible can be evaluated to find characteristic wavelengths of light. Depending on the region in which people live, the reflection spectra have different characteristic wavelengths of light, i.e., different average tooth colors. In this case, the light wavelength of the light sources 105 can be adjusted to the respective region.

In this way, spatially resolved and precise color measurement can be achieved, since the spectral resolution is sufficient, i.e., the number of spectral points for the colors used for structured-light projection, to calculate as continuous a spectrum as possible for each location on the surface of the dental object 103 from the spatially resolved optical parameter sets. This continuous spectrum for each location on the surface can then be converted to L*a*b* values. The L*a*b* color space (also: CIELAB, CIEL*a*b*, Lab colors) describes all perceptible colors. This uses a three-dimensional color space in which the brightness value L* is perpendicular to the color plane (a*, b*).

First, X, Y, and Z values are calculated from the reflection spectrum, from which then L*a*b* are calculated:

$$X = \frac{1}{N} \int_{\lambda} x(\lambda) S(\lambda) I(\lambda) d\lambda$$

$$Y = \frac{1}{N} \int_{\lambda} y(\lambda) S(\lambda) I(\lambda) d\lambda$$

$$Z = \frac{1}{N} \int_{\lambda} z(\lambda) S(\lambda) I(\lambda) d\lambda$$

$$N = \frac{1}{N} \int_{\lambda} y(\lambda) I(\lambda) d\lambda$$

If striped patterns 101-1 and 101-2 are each used with a specific optical light wavelength, a spatially resolved optical parameter set is obtained for exactly this wavelength of light. Sufficiently many calculations with other wavelengths of light can then yield further spatially resolved optical parameter sets over the entire visible spectrum. Thus, for each location, one obtains a specific continuous course of optical parameters.

In this way, L*a*b* color values are obtained when a reflection spectrum has been measured, still corrected in direct comparison with white (ideal scatterer) and black (minimum reflectance) reference. If the absorption and scattering coefficients are known, it is not absolutely necessary to first calculate a reflection spectrum in order to then generate L*a*b* color values from it.

FIG. 2 shows a block diagram of a method for spatially resolved color determination. In step S101, one or more first structured-light patterns 101-1 having the first wavelength of light are projected onto the dental object 103. Here, different and varying spatial frequencies of the structured-light pattern 101-1 may be used as long as the wavelength of light of the structured-light pattern 101-1 remains unchanged. From the first structured-light patterns 101-1, which are reflected by the dental object 103, a spatial shape of the dental object 103 can be determined. For this purpose, an algorithm evaluates the course of the stripes in the reflected or remitted structured-light pattern 101-1.

However, the 3D geometry can also be determined at the shortest possible wavelengths (blue light) to keep the penetration depth to a minimum. Furthermore, for example, non-periodic patterns can be used to better perform stripe mapping.

In step S102, a first spatially resolved optical parameter set is additionally determined based on the first structured-light patterns 101-1 reflected or remitted from the dental object 103. The first spatially resolved optical parameter set comprises, for example, spatially resolved values for a reflectance, an absorption coefficient, and/or a scattering coefficient at the first wavelength of light. Therefore, the structured-light method not only determines the spatial shape of the dental object 103, but also determines a distribution of an optical parameter on the surface of the dental object 103 at the first wavelength of light. At least one optical parameter can be assigned to each location on the surface of the dental object 103. The totality of these optical parameters for the respective locations is comprised in the first spatially resolved optical parameter set.

In step S103, one or more second structured-light patterns 101-2 are also projected onto the dental object 103 using the second wavelength of light. Here, different and varying spatial frequencies of the structured-light pattern 101-2 can also be used as long as the wavelength of light of the striped patterns 101-2 remains unchanged. In this case, the measurement is performed at a different wavelength of light than the first wavelength of light. From the second structured-light patterns 101-2 reflected or remitted from the dental object 103, the spatial shape of the dental object 103 can also be determined.

In step S104, a second spatially resolved optical parameter set is determined based on the second structured-light patterns 101-2 reflected or remitted from the dental object 103. From this spatially resolved optical parameter set, a further distribution of optical properties over the surface of the dental object 103 at the second wavelength of light is obtained. The second spatially resolved optical parameter set comprises, for example, spatially resolved values for a reflectance, an absorption coefficient, and/or a scattering coefficient at the second wavelength of light in a corresponding manner to the first spatially resolved optical parameter set. The totality of these optical parameters for the respective locations is comprised in the second spatially resolved optical parameter set.

In step S105, a third spatially resolved optical parameter set at the third wavelength of light is calculated based on the first and second spatially resolved optical parameter sets. The third spatially resolved optical parameter set indicates the optical parameter as if it had been measured at the third wavelength of light. However, since this is calculated, the use of a light source 105 for this purpose can be omitted. The method for calculating the third spatially resolved optical parameter set is performed by the calculation device 111.

This can be done in a simple way, for example, by interpolating or extrapolating for the third wavelength of light between the first spatially resolved optical parameter set and the second spatially resolved optical parameter set in the wavelength range. For example, by interpolating or extrapolating, it is possible to calculate the corresponding optical properties for each wavelength value. The interpolation or extrapolation can be performed for any location on the surface of the dental object 103. Thus, a continuous spectrum can be obtained for each location on the surface of the dental object 103.

For example, from two measured values of the absorption coefficient $\alpha_{x1,y1,z1,\lambda1}$ at the location x1, y1 and z1 at the light wavelength $\lambda1$ and the absorption coefficient $\alpha_{x1,y1,z1,\lambda2}$ at the same location x1, y1 and z1 at the light wavelength $\lambda2$, a general course of the absorption coefficient $\alpha_{x1,y1,z1}(\lambda)$ as a function of the wavelength of light at the location x1, y1 and z1 can be determined.

In the simplest case, this involves interpolating between the two measured absorption coefficients $\alpha_{x1,y1,z1,\lambda1}$ and $\alpha_{x1,y1,z1,\lambda2}$ or extrapolating the two measured absorption coefficients $\alpha_{x1,y1,z1,\lambda1}$ and $\alpha_{x1,y1,z1,\lambda2}$. This establishes a general linear relationship $\alpha_{x1,y1,z1}(\lambda)$ as a function of the wavelength of light at the location x1, y1, and z1.

If this procedure is performed for all locations x, y, z on the surface of the dental object 103, a third spatially resolved optical parameter set at each desired third wavelength of light is obtained from the first and second spatially resolved optical parameter sets. A light source 105 at this wavelength of light can then be dispensed with, so that the installation space is reduced accordingly.

Figure 3:
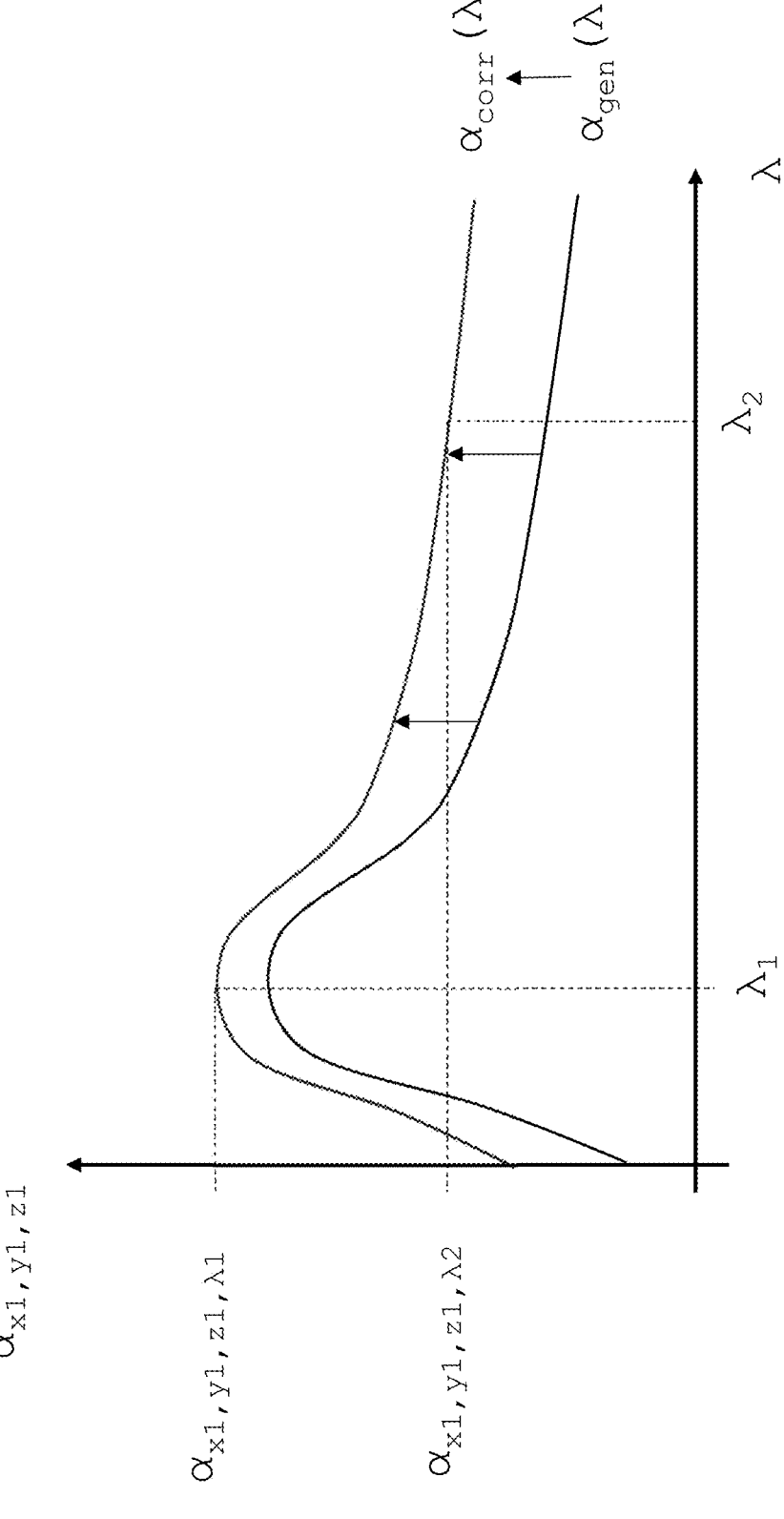
FIG. 3 shows a principle of a correction of a general course of the absorption coefficient on the basis of two measured values.

FIG. 3 shows the principle of correcting a general course of the absorption coefficient based on two measured values, namely the absorption coefficient $\alpha_{x1,y1,z1,\lambda1}$ at the location x1, y1 and z1 at the light wavelength $\lambda1$ and the absorption coefficient $\alpha_{x1,y1,z1,\lambda2}$ at the same location x1, y1 and z1 at the light wavelength $\lambda2$. By this method, a third spatially resolved optical parameter set at any third light wavelength $\lambda3$ can be obtained, as when this is performed for the corresponding locations of the surface of the dental object 103.

For this purpose, a general generic course of the absorption coefficient $\alpha_{gen}(\lambda)$ can be specified for, for example, a tooth, which is adapted to the two measured absorption coefficients $\alpha_{x1,y1,z1,\lambda1}$ and $\alpha_{x1,y1,z1,\lambda2}$, for example, by subtracting a difference from the measured absorption coefficients $\alpha_{x1,y1,z1,\lambda1}$ and $\alpha_{x1,y1,z1,\lambda2}$ or by a fit process. The fit process can be based on an expected functional relationship between the optical parameter and the wavelength of light. By the fit process, fit parameters of the functional relationship are changed in such a way that the measured absorption coefficients $\alpha_{x1,y1,z1,\lambda1}$ and $\alpha_{x1,y1,z1,\lambda2}$ are as close as possible to the fit function.

For example, the predetermined course may also be based on a previously measured empirical spectrum of a similar dental object 103 or on a principal functional course observed for that class of dental objects 103 in a similar form at all locations on the surface of the dental object 103.

From the general course of the absorption coefficient $\alpha_{gen}(\lambda)$, any absorption coefficient $\alpha_{x1,y1,z1,\lambda3}$ at any other light wavelength $\lambda3$ can be calculated. For this purpose, for example, the general course of the absorption coefficient $\alpha_{gen}(\lambda)$ is adjusted to the two previously measured absorption coefficients $\alpha_{x1,y1,z1,\lambda1}$ and $\alpha_{x1,y1,z1,\lambda2}$, so that a corrected course $\alpha_{corr}(\lambda)$ is obtained. For example, the general course of the absorption coefficient $\alpha_{gen}(\lambda)$ can be shifted, sheared, compressed, rotated, or otherwise corrected based on the two measured absorption coefficients $\alpha_{x1,y1,z1,\lambda1}$ and $\alpha_{x1,y1,z1,\lambda2}$.

Therefore, from the first and second spatially resolved optical parameter sets, any number of third spatially resolved optical parameter sets can be calculated at any wavelength of light $\lambda3$. In this way, a complete quasi-continuous spectral course of the absorption coefficient $\alpha$ is obtained for each point x, y, and z on the surface of the tooth, and complete spectral information can be obtained for each point on the surface. This method works not only with the absorption coefficient $\alpha$, but also with other optical parameters. In principle, the method allows precise color measurement for any object for which an approximate course of the optical parameters is known in advance.

Furthermore, when using different spatial frequencies of the structured-light pattern, optical information from different depths of the dental object 103 can be obtained. With this information, a determination of the reflectance, the absorption coefficient and/or the scattering coefficient can be further improved.

With this method, not only a point measurement of the color properties is carried out, but two-dimensional color measurements are performed, for example for numerous points in an area of 10×10 mm. This means that the optical parameters of each of these points can be calculated at any wavelength of light. Thus, a complete and continuous color spectrum is obtained for each point of the surface, for which the optical parameter can be obtained in arbitrarily small spectral resolution. The use of incomplete reflection spectra can be dispensed with.

In the case of a tooth as a dental object 103, the translucency of an enamel is automatically co-determined because it is only one manifestation of the intrinsic optical properties of absorption and scattering. Absorption and scattering properties of enamel are hidden in the depth-resolved measurements at different spatial frequencies. Therefore, the transparency, also called translucency, is intrinsically co-known. In addition to L*a*b* values, translucency can be used to achieve a natural-looking dental prosthesis.

Another technical advantage is that the method allows angle-dependent measurement. The angle changes the color measurement on a human tooth and the gingiva due to the different environment. By combining this with the three-dimensional data for the dental object 103, it is possible to determine the angle for each pair of spatial and color data. From this, an accurate digital spatial image of a tooth can be obtained in connection with the color measurement. The calculation can be further improved by measuring the three-dimensional topography of the dental object 103.

With the method for spatially resolved color determination, not only can the optical parameters of teeth be determined intraorally, but also the optical parameters of dental restorations, such as veneers, crowns, bridges, inlays or onlays, extraorally. Restoration and material recognition can also be carried out by comparison with values from a database.

The dental restoration or tooth or teeth is then fabricated using the determined color.

The spatially resolved color determination method can be performed in an interchangeable attachment of an intraoral scanner. Light and striped pattern generation can also take place in the interchangeable attachment of the intraoral scanner. A striped pattern generation can be performed in the attachment of the intraoral scanner using a micro LCD display. Capturing the images of the reflected or remitted structured-light patterns can be performed by a camera chip in the main housing of the intraoral scanner.

All of the features explained and shown in connection with individual embodiments of the invention may be provided in different combinations in the subject matter of the invention to simultaneously realize their beneficial effects.

All method steps can be implemented by devices which are suitable for executing the respective method step. All functions that are executed by the features of the subject matter can be a method step of a method.

The scope of protection of the present invention is given by the claims and is not limited by the features explained in the description or shown in the figures.

REFERENCE LIST

100 Color determination system
101 Structured-light pattern
103 Dental object
105 Light source

107 Projector or Projection device
109 Detector or Detection device
111 Calculator or Calculation device

The invention claimed is:

1. A method for spatially resolved color determination, comprising
   projecting (S101) a first structured-light pattern (101-1) having a first wavelength of light onto a dental object (103);
   detecting (S102) a first spatially resolved optical parameter set based on the reflected or remitted first structured-light pattern (101-1);
   projecting (S103) a second structured-light pattern (101-2) having a second wavelength of light onto the dental object (103);
   detecting (S104) a second spatially resolved optical parameter set based on the reflected or remitted second structured-light pattern (101-2); and
   calculating (S105) a third spatially resolved optical parameter set at a third wavelength of light based on the first spatially resolved and second spatially resolved optical parameter sets;
   wherein a predetermined spectral course is matched to the first spatially resolved and second spatially resolved optical parameter sets to obtain the third spatially resolved optical parameter set; and
   wherein the predetermined spectral course is a course of a reflectance, an absorption coefficient and/or a scattering coefficient depending on the wavelength of light.

2. The method according to claim 1, wherein the third spatially resolved parameter set is determined by a fit process based on the first spatially resolved and second spatially resolved optical parameter sets.

3. The method according to claim 1, wherein the first spatially resolved optical parameter set and/or second spatially resolved optical parameter set assign(s) one or more optical parameters to the locations on a surface of the dental object (103), respectively.

4. The method according to claim 1, wherein the first structured-light pattern (101-1) is generated with a first light source (105-1) and the second structured-light pattern (101-2) is generated with a second light source (105-2).

5. The method according to claim 1, wherein the method is performed by an intraoral scanner.

6. A color determination system (100) for spatially resolved color determination, comprising
   a first projector (107) for projecting a first structured-light pattern (101-1) of a first wavelength of light onto a dental object (103);
   a first detector (109) for detecting (S102) a first spatially resolved optical parameter set based on a reflected or remitted first structured-light pattern (101-1);
   a second projector (107) for projecting (S103) a second structured-light pattern (101-2) of a second wavelength of light onto the dental object (103);
   a second detector (109) for detecting (S104) a second spatially resolved optical parameter set based on the reflected or remitted second structured-light pattern (101-2); and
   a calculator (111) for calculating (S105) a third spatially resolved optical parameter set at a third wavelength of light based on the first spatially resolved and second spatially resolved optical parameter sets;

wherein the color determination system (100) is configured to adjust a predetermined spectral course to the first spatially resolved and second spatially resolved optical parameter sets to obtain the third spatially resolved optical parameter set; and wherein the predetermined spectral course is a course of a reflectance, an absorption coefficient and/or a scattering coefficient depending on the wavelength of light.

7. The color determination system (100) according to claim 6, wherein the color determination system (100) is configured to extrapolate the third spatially resolved optical parameter set from the first spatially resolved and second spatially resolved optical parameter sets and/or to interpolate the third spatially resolved optical parameter set between the first spatially resolved and second spatially resolved optical parameter sets.

8. The color determination system (100) according to claim 6, comprising a first light source (105-1) for generating the first structured-light pattern (101-1) and a second light source (105-1) for generating the second structured-light pattern (101-1).

9. An intraoral scanner with a color determination system (100) according to claim 6.

10. A color determination system (100) for spatially resolved color determination, comprising a projector (107) for projecting a first structured-light pattern (101-1) of a first wavelength of light onto a dental object (103) and a second structured-light pattern (101-2) of a second wavelength of light onto the dental object (103);

a detector (109) for detecting (S102) a first spatially resolved optical parameter set based on the reflected or remitted first structured-light pattern (101-1) and a second spatially resolved optical parameter set based on the reflected or remitted second structured-light pattern (101-2); and a calculator (111) for calculating (S105) a third spatially resolved optical parameter set at a third wavelength of light based on the first spatially resolved and second spatially resolved optical parameter sets;

wherein the color determination system (100) is configured to adjust a predetermined spectral course to the first spatially resolved and second spatially resolved optical parameter sets to obtain the third spatially resolved optical parameter set; and wherein the predetermined spectral course is a course of a reflectance, an absorption coefficient and/or a scattering coefficient depending on the wavelength of light.

11. The color determination system (100) according to claim 10, wherein the color determination system (100) is configured to extrapolate the third spatially resolved optical parameter set from the first spatially resolved and second spatially resolved optical parameter sets and/or to interpolate the third spatially resolved optical parameter set between the first spatially resolved and second spatially resolved optical parameter sets.

12. The color determination system (100) according to claim 10, comprising a first light source (105-1) for generating the first structured-light pattern (101-1) and a second light source (105-1) for generating the second structured-light pattern (101-1).

* * * * *